Figure 1:
Figure 2:
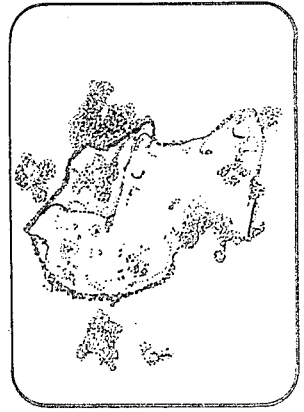

Jan. 3, 1933.  H. N. BARRETT  1,893,047
REFINED MAGNESIA PRODUCT FROM MINERAL SOURCES
OF MAGNESIA AND PROCESS OF MAKING SAME
Filed March 31, 1930

INVENTOR.
Harvey N. Barrett
BY
Fay, Oberlin & Fay
ATTORNEYS.

Patented Jan. 3, 1933

1,893,047

UNITED STATES PATENT OFFICE

HARVEY N. BARRETT, OF TIFFIN, OHIO, ASSIGNOR TO DOLOMITE, INC., OF CLEVELAND, OHIO, A CORPORATION OF OHIO

REFINED MAGNESIA PRODUCT FROM MINERAL SOURCES OF MAGNESIA AND PROCESS OF MAKING SAME

Application filed March 31, 1930. Serial No. 440,289.

This invention relates to the treatment of natural mineral sources of magnesium and calcium compounds, such as dolomite and magnesian limestone, magnesite, etc.; and more particularly the production of separated products from such crude sources; and it is among the objects of the invention to provide products of purity, as desired, and with advantageous uniformity. Another object is the provision of procedure making possible marked economies in reagents employed. A further object is the provision of a continuous or cyclic order of procedure, with effective usage and stagewise return of materials in the process. Other objects and advantages will appear as the description proceeds.

To the accomplishment of the foregoing and related ends, the invention, then, consists of the features hereinafter fully described, and particularly pointed out in the claims, the following description setting forth certain procedure illustrative of the invention, such being indicative however of but a few of the various ways in which the principle of the invention may be employed.

In the accompanying drawing:—

Figs. 1–4 inclusive show photomicrographs illustrating the products possible.

In its general aspects, the invention contemplates treating a crude mineral source of calcium and magnesium compounds, such as dolomite or magnesian limestone, etc., by heating such a material with an ammonium compound, as an ammonium halide, at a temperature to react to form a soluble calcium halide, and then separating magnesium oxide and the calcium halide by dissolving out the latter, and precipitating the calcium as calcium carbonate. Depending upon the particular temperature employed, the results may be somewhat varied as to the detail character of the calcined product. One range of temperatures for instance resulting in a calcined product which is rather hard and dense and heavy, while another range of temperature treatment results in a product of loosely sintered character, very easily disintegrated mechanically and by the action of water. Generally I prefer to treat at a temperature below the melting point of the calcium halide formed. Various stagewise and cyclic usages of material are also contemplated.

Depending upon how far the separation is carried, products may be had in the form of completely isolated calcium or magnesium compounds, or magnesium compounds with admixture of a controlled amount of lime. The raw mineral, dolomite or the like, is mixed with the ammonium halide, being ground either separately or together. Fine grinding favors reactive conditions. In general, the amount of ammonium halide may range from one to two parts by weight to each part by weight of calcium carbonate analytically determined in the raw mineral. The mixture is then heated to reaction temperature whereupon calcium halide, ammonium carbonate and magnesium oxide are formed. The ammonium carbonate in volatilized form passes off along with a small amount of ammonium halide which is recovered with the ammonium carbonate. To take care of the volatilization of ammonium halide it is good practice to use an excess of the latter. In the preferred form of the invention, the heating is carried on in a muffle furnace, the temperature being closely controlled below the melting point of the calcium halide formed, and the calcined product is then of a porous spongy character. Whether treated in a rotary kiln or in a muffle furnace, and at higher or lower temperatures, the reaction product is subjected to the action of water to dissolve the calcium halide, and the resulting solution is filtered from the magnesium oxide, and thereafter is treated to precipitate calcium carbonate. This precipitation is accomplished advantageously by using the volatilized ammonium carbonate driven off from the reaction zone, the ammonium carbonate being brought into intimate contact with the solution in any suitable manner. The calcium carbonate may then be removed by filtration. The ammonium halide filtrate may again be used in the cycle, being first concentrated by evaporation if desired.

Any ammonium halide reacting to form a soluble calcium halide may be used. The particular halide so employed will depend somewhat upon considerations of availability; but since the halide can be recovered and be recycled in successive use, and there is no loss other than slight incidental mechanical losses, the matter of the cost of reagent is of slight importance. For the sake of clarity and convenience in the illustrative examples which follow, reference is made to the use of ammonium chloride as the reagent and of dolomite as the mineral source of magnesia.

As indicated, the calcination may be carried out at a temperature at which the chloride melts, a hard, dense and heavy product being thus formed, which when pulverized does not disintegrate readily when treated with water and the calcium chloride dissolves with difficulty and slowly. The insoluble residue does not settle and is troublesome to filter. The increased time necessary for settling and filtration promotes the hydration of the magnesia. On the other hand, if the temperature of operation be controlled to prevent the fusing or melting of the products, there results a light spongy product which is easily reactive to water solution and separation.

In the accompanying figures, 1-4, are shown photomicrographs illustrating these possible differences in product. Microscopic examination of the reaction product obtained by heating to the fusing temperature of the calcium chloride shows well defined crystals of CaO in cubes, or in large fragments showing the cubic cleavage of CaO (Figs. 1 and 2), and with the characteristic index of refraction of 1.83. Fused calcium chloride easily dissolves lime to form a clear melt and on cooling the dissolved CaO separates from the melt in large transparent crystals. As is well known, the crystalline variety of lime slakes down and hydrates in water very slowly, and it may be kept in water for days without complete hydration. The slow hydration of this crystalline lime makes it impossible to effect a complete separation in a reasonable time. Accordingly, when the process is operated within the fusing temperature range, the procedure subsequent is slower.

Figure 3:
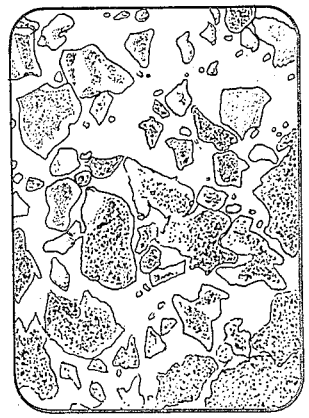
Figure 4:
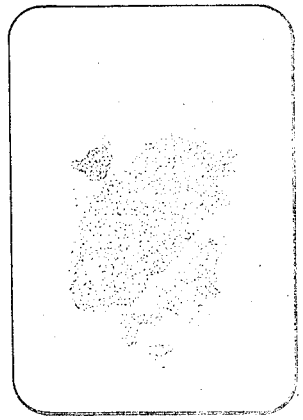

A microscopic examination of the product produced at a temperature slightly below that of the melting temperature of the calcium halide shows a loosely sintered spongy mass composed of large crystals of the anisotropic form of calcium chloride, in which are enclosed tiny isotropic particles of magnesium oxide probably in the form of periclase (Figs. 3 and 4). The structure as revealed by microscopic examination of this loosely sintered spongy product indicates that the calcium chloride crystals were formed in most part by the reaction through the vapor phase and without the intermediate formation of a liquid phase such as molten calcium chloride. When this reaction is carried out at a temperature below the melting point of calcium chloride, any free lime that may exist in the product appears in the so-called amorphous form and as very tiny particles which rapidly disintegrate, hydrate and then dissolve in the calcium chloride solution.

In the fusion of anhydrous calcium chloride, there is a loss in chlorine resulting in the formation of CaO which dissolves in the molten chloride, subsequently separating as the crystalline or dead burned variety of lime; therefore, it is necessary for a complete separation to effect the calcination reaction without fusing any of the products of the reaction.

The following is one example of the process: Raw dolomite is treated with 2 parts by weight of ammonium chloride to each part by weight of calcium carbonate analytically present in the raw dolomite. The dolomite should desirably be in a powdered form so that 90 per cent. would pass through a 100 mesh sieve. The dolomite, mixed with the ammonium chloride or made into a slurry with the ammonium chloride solution is fed into a kiln or furnace such that the reaction product is not heated to a temperature much in excess of 750° C. I have successfully used as the first stage of heating a rotary drier into which is fed a wet slurry composed of a solution of ammonium chloride and the powdered dolomite. The slurry advances in the drier and the solution evaporates, the dried product issuing from the drier in light, porous balls or lumps. This product drops onto a conveyor which conducts the material through a muffle tunnel kiln without further mechanical agitation, the kiln being uniformly heated to a temperature such that the reacting substances and products of reaction are heated at a temperature of from 600 to 750° C. The ammonium chloride reacts with the dolomite as illustrated as follows:

$$CaMg(CO_3)_2 + 2NH_4Cl = MgO + CaCl_2 + (NH_4)_2CO_3 + CO_2.$$

Ammonium carbonate, together with a small amount of ammonium chloride, passes off in volatilized form, and these may be collected by dissolving in water or preferably by condensing with steam. The product discharged from the kiln is in the form of loosely sintered, fragile, porous balls or lumps which when treated with water readily disintegrates. Calcium chloride passes into solution, magnesium oxide settles readily, and the solution is filtered from the insoluble magnesium oxide.

The calcium chloride solution is treated with the ammonium carbonate from the first reaction to form insoluble calcium carbonate and dissolved ammonium chloride. This latter reaction may be illustrated by the equation:

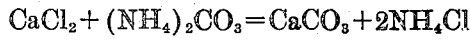

The solution of ammonium chloride is mixed with more raw dolomite, and the mixture is processed as before, thus making a completely continuous and cyclic operation.

Variation as to detail may be had, depending upon particular conditions and requirements. The temperature, for instance, may range somewhat differently from that illustratively stated, but should in no case exceed the melting temperatures of any of the products of the reaction if complete separation is desired. Calcined products may accordingly be had in which a part of the calcium carbonate is converted into a light weight, porous, spongy calcium halide, or in which all of the calcium carbonate has been so converted. The quantity of water employed in dissolving the calcined material is in large degree a matter of feasible adaptation to convenience in particular plant equipment. The evaporation of the ammonium halide solution may be practiced to such point as is most economical and efficient.

The raw materials as fed to the kiln may be either in dry or wet state, as preferred. Ordinarily, with a complete cycle basis of operation, the material will be employed in wet state when delivered into the kiln.

Other modes of applying the principle of the invention may be employed, change being made as regards the details disclosed, provided the steps stated in any of the following claims, or the equivalent of such, be employed.

I therefore particularly point out and distinctly claim as my invention:—

1. A process of treating magnesium-containing limestone, which comprises heating such material with an ammonium halide to form MgO and a water-soluble calcium halide.

2. A process of treating magnesium-containing limestone, which comprises heating such material with an ammonium halide and forming a light weight, porous, spongy product consisting of MgO uniformly dispersed through loosely consolidated crystals of a water soluble calcium halide.

3. A process of treating magnesium-containing limestone, which comprises heating such material with ammonium chloride to form MgO and calcium chloride.

4. A process of treating magnesium-containing limestone, which comprises heating such material with ammonium chloride and forming a light weight, porous, spongy product consisting of MgO uniformly dispersed through loosely consolidated crystals of calcium chloride.

5. A process of treating magnesium-containing limestone, which comprises heating such material with an ammonium halide at a temperature below the melting temperature of the calcium to form MgO and a water-soluble calcium halide.

6. A process of treating magnesium-containing limestone, which comprises heating such material with ammonium chloride at a temperature of 600° to 750° C.

7. A process of treating magnesium-containing limestone, which comprises heating such material with an ammonium halide, and dissolving calcium halide from the product.

8. A process of treating magnesium-containing limestone, which comprises heating such material with an ammonium halide to formation of MgO and a water-soluble calcium halide below the melting temperature of the calicum halide, and dissolving the halide from the calcined product.

9. A process of treating magnesium-containing limestone, which comprises heating such material with ammonium chloride at a temperature of 600° to 750° C., and dissolving calcium chloride from the product.

10. A process of treating magnesium-containing limestone, which comprises heating such material with an ammonium halide, dissolving calcium halide from the product, and precipitating calcium as carbonate from the solution formed.

11. A process of treating magnesium-containing limestone, which comprises heating such material with an ammonium halide, dissolving calcium halide from the product, treating such solution with ammonium carbonate to form calcium carbonate and ammonium halide, and returning ammonium halide to the first step.

12. A process of treating magnesium-containing limestone, which comprises heating such material with an ammonium halide to formation of MgO and a water-soluble calcium halide below the melting temperature of the calcium halide, dissolving the halide from the calcined product, treating such solution with ammonium carbonate to form calcium carbonate and ammonium halide, and returning ammonium halide to the first step.

13. A process of treating magnesium-containing limestone, which comprises heating such material with ammonium chloride at a temperature of 600° to 750° C., dissolving calcium chloride from the product, treating such solution with ammonium carbonate to form calcium carbonate and ammonium chloride, and returning ammonium chloride to the first step.

14. A process of treating magnesium-containing limestone, which comprises heating such material with an ammonium halide to form a water-soluble calcium halide and volatilized ammonium carbonate, dissolving calcium halide from the product, and treating such solution with the ammonium carbonate.

15. A process of treating magnesium-containing limestone, which comprises heating such material with an ammonium halide to formation of MgO, a water-soluble calcium halide below the melting temperature of the calcium halide, and volatilized ammonium carbonate, dissolving calcium halide from the calcined product, and treating such solution with the ammonium carbonate.

16. A process of treating magnesium-containing limestone, which comprises heating such material with an ammonium halide to form a water-soluble calcium halide and volatilized ammonium carbonate, dissolving calcium halide from the product, condensing the volatilized ammonium carbonate with steam, and returning such ammonium carbonate to the calcium halide solution.

17. A process of treating magnesium-containing limestone, which comprises heating such material with an ammonium halide to formation of MgO, a water-soluble calcium halide below the melting temperature of the calcium halide, and volatilized ammonium carbonate, dissolving calcium halide from the calcined product, treating the calcium halide solution with the ammonium carbonate to form calcium carbonate and ammonium halide, and returning ammonium halide to the first step.

18. A process of treating magnesium-containing limestone, which comprises heating such material with an ammonium halide to form a light weight, porous, spongy product consisting of MgO uniformly dispersed through loosely consolidated crystals of a water soluble calcium halide, and volatilized ammonium carbonate, dissolving calcium halide from the calcined product, condensing the volatilized ammonium carbonate with steam, returning the ammonium carbonate to the calcium halide solution to form calcium carbonate and regenerating ammonium halide, and returning ammonium halide to the first step.

19. A process of treating magnesium-containing limestone, which comprises heating such material with ammonium chloride to form a light weight, porous, spongy product consisting of MgO uniformly dispersed through loosely consolidated crystals of calcium chloride and volatilized ammonium carbonate, dissolving calcium chloride from the calcined product, condensing the volatilized ammonium carbonate with steam, returning the ammonium carbonate to the calcium chloride solution to form calcium carbonate and regenerating ammonium chloride, and returning ammonium chloride to the first step.

20. As a new article of manufacture, a light weight, porous, spongy product made from magnesium-containing limestone in which a substantial part of the calcium carbonate has been converted into a water-soluble anhydrous calcium halide, a substantial part of which is present as loosely cohering aggregates of anhydrous calcium halide crystals with admixed magnesium oxide.

21. As a new article of manufacture, a light weight, porous, spongy product made from magnesium-containing limestone in which a substantial part of the calcium carbonate has been converted into a porous aggregate of loosely cohering crystals of a water-soluble anhydrous calcium halide with admixed magnesium oxide.

22. As a new article of manufacture, a light weight, porous, spongy product made from magnesium-containing limestone in which substantially all of the calcium carbonate has been converted into a porous aggregate of loosely cohering crystals of water-soluble anhydrous calcium halide with admixed magnesium oxide.

23. As a new article of manufacture, a light weight, porous, spongy product made from magnesium-containing limestone in which a substantial part of the calcium carbonate has been converted into water-soluble anhydrous calcium chloride, a substantial part of which is present as loosely cohering aggregates of anhydrous calcium chloride crystals with admixed magnesium oxide.

Signed by me, this 23 day of January, 1930.

HARVEY N. BARRETT.